(12) United States Patent
Tamura et al.

(10) Patent No.: US 6,424,297 B2
(45) Date of Patent: Jul. 23, 2002

(54) METHOD FOR DETECTING THE POSITION OF A MOVING BODY

(75) Inventors: Kazuya Tamura; Tatsuya Nishikawa, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/820,718

(22) Filed: Mar. 30, 2001

(30) Foreign Application Priority Data

Mar. 30, 2000 (JP) ........................................ 2000-094696
Mar. 19, 2001 (JP) ........................................ 2001-079545

(51) Int. Cl.[7] .............................. G01S 1/24; G01S 5/14
(52) U.S. Cl. ................................... 342/387; 342/357.14
(58) Field of Search ........................... 342/357.14, 387; 455/456; 375/356

(56) References Cited

U.S. PATENT DOCUMENTS

| | | | |
|---|---|---|---|
| 3,680,121 A | * | 7/1972 | Anderson et al. ............ 342/457 |
| 4,812,852 A | * | 3/1989 | Bent et al. ................... 342/457 |
| 5,604,765 A | | 2/1997 | Bruno et al. |
| 5,815,538 A | * | 9/1998 | Grell et al. .................. 375/356 |
| 6,054,950 A | * | 4/2000 | Fontana ...................... 342/363 |
| 6,101,178 A | * | 8/2000 | Beal ........................... 370/336 |

OTHER PUBLICATIONS

International Publication No. WO 99/48233, published Sep. 23, 1999.
International Publication No. WO 99/56143, published Nov. 4, 1999.

* cited by examiner

Primary Examiner—Thomas H. Tarcza
Assistant Examiner—Fred H Mull
(74) Attorney, Agent, or Firm—Arent Fox Kintner Plotkin & Kahn, PLLC

(57) ABSTRACT

A method is provided for detecting the position of a moving body in which the position of a moving body such as a vehicle can be detected with a high degree of precision. It is possible to perform at least data communication using radio waves between radio base stations and a vehicle capable of movement. Precise positions are stored in advance in the radio base stations and radio wave clocks that keep a common time are provided in the radio base stations. The radio base stations transmit radio waves containing this time information. The vehicle receives these radio waves and determines the difference between the received time information and a clock provided in the vehicle in order to detect the current position of the vehicle by calculating the distances between the vehicle and each of the radio base stations.

4 Claims, 3 Drawing Sheets

METHOD FOR DETECTING THE POSITION OF A MOVING BODY

BACKGROUND OF THE INVENTION

1. Field of the Invention

The present invention relates to a method for detecting the position of a moving body and, in particular, to a method for detecting the position of a moving body in which the position of a moving body can be detected with a high degree of accuracy.

2. Description of the Related Art

Conventional methods for detecting the position of a moving body are the method used in GPS (Global Positioning Systems) and those used in PHS (Personal Handy phone Systems) and the like.

In the method used in GPS, the distance (i.e. the pseudo range) between GPS satellites and a moving body is calculated using the radio wave propagation time between the GPS satellites and the moving body. Respective spheres that take the calculated pseudo range between the moving body and each of four GPS satellites as the radiuses thereof are determined, and the intersect point of these spheres is used as the position of the moving body.

In the method used in PHS, the fact that the area from which a signal can be received of a base station capable of receiving radio waves transmitted from a PHS terminal is limited is used effectively, and the position of the person holding the PHS terminal is detected from the position of the base station receiving the radio waves from the PHS terminal.

However, among the above conventional moving body position detecting methods, in the method used in GPS, the drawback exists that, if it is not possible to pick up four or more GPS satellites simultaneously, then it is not possible to detect the position of the moving body. In the method used in PHS, although it is possible to pinpoint the position of the holder of the PHS terminal as being within the area covered by the base station (within 100 to 300 meters), the drawback exists that it is difficult to detect this position with a high degree of accuracy.

SUMMARY OF THE INVENTION

Therefore, an object of the present invention is to provide a method for detecting the position of a moving body in which the position of the moving body can be detected with a high degree of accuracy.

In order to achieve the above object, the present invention provides a moving body position detection method for detecting a current position of a mobile station (for example, the vehicle 1 in the embodiment) capable of movement and also capable of data communication between itself and at least fixed stations (for example, the radio base stations 3 in the embodiment) using radio waves, wherein precise positions of the fixed stations are stored in advance in the mobile station, clocks (for example, the radio wave clocks 10 in the embodiment) are provided for keeping a common time respectively in the fixed stations and the fixed stations send radio waves containing time information of the clocks, the mobile station receives the radio waves sent by the fixed stations and calculates distances between the mobile station and the fixed stations by determining differences between a clock (for example, the clock 15 in the embodiment) provided in the mobile station and the time information contained in the radio waves, and the mobile station calculates the position of the mobile station from the calculated distances and from the precise positions of the fixed stations that were stored in advance. By employing this type of structure, it is possible to determine the precise position of the mobile station by calculating the distances between the mobile station and three or more fixed stations. Accordingly, even in a location where conventional GPS satellites cannot be used, it is still possible to accurately determine the position of the mobile station.

Furthermore, in the present invention, it is also possible for the position of the mobile station to be calculated using a combination of information from the fixed station and information from GPS satellites (for example, the GPS satellites 8 in the embodiment). By employing this type of structure, it is possible to calculate the position of the mobile station even when it is not possible to calculate the position of the mobile station using the fixed stations alone or GPS satellites alone. Therefore, it is possible to find the position of the mobile station more accurately than when a conventional method is used.

Furthermore, in the present invention, it is preferable if the mobile station performs communication with the fixed stations using the same transmission method as is used in the GPS satellites.

Furthermore, in the present invention, it is also possible for the clocks in the fixed stations to be set based on time information from the GPS satellites (8). By employing this type of structure, it is possible to obtain accurate time information from the GPS satellites that are provided with atomic clocks. Therefore, for example, accurate time is guaranteed even when it is not possible to receive radio waves from a radio wave clock.

Furthermore, in the present invention, it is also possible for the clocks in the fixed stations to be set based on time information sent by a radio wave clock base station (12) as well as on the positions of the fixed stations and the radio wave clock base station.

Furthermore, in the present invention, it is also possible, when information cannot be obtained from a predetermined number of fixed stations, for the mobile station to calculate the position of the mobile station by substituting information from the GPS satellites for the information that should have been obtained from the fixed stations.

DETAILED DESCRIPTION OF THE PREFERRED EMBODIMENTS

The embodiment of the present invention will now be described together with the drawings.

Figure 1:
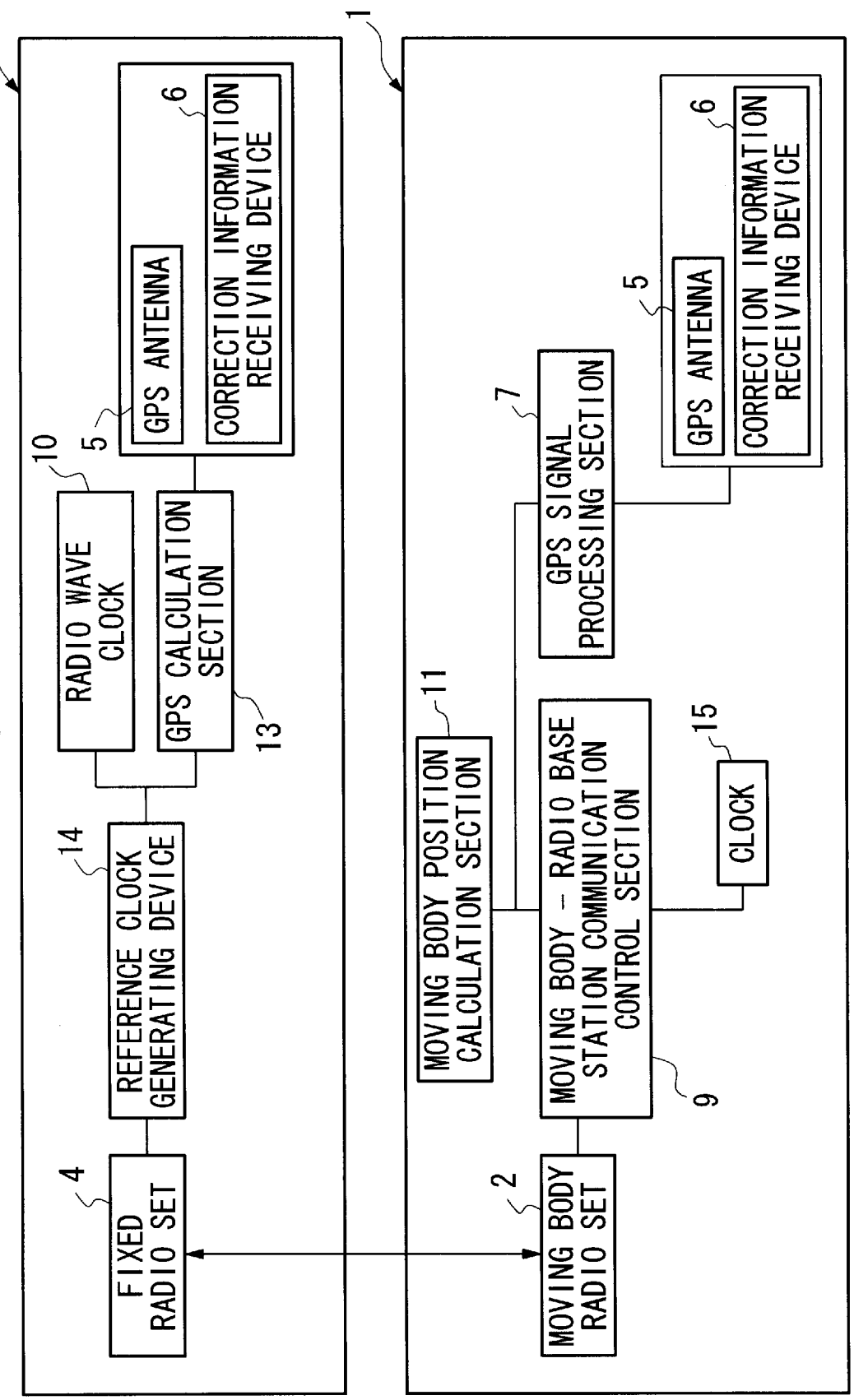
FIG. 1 is a view of the structure of a system for deciding a position using radio and GPS of the embodiment of the present invention.
Figure 2:
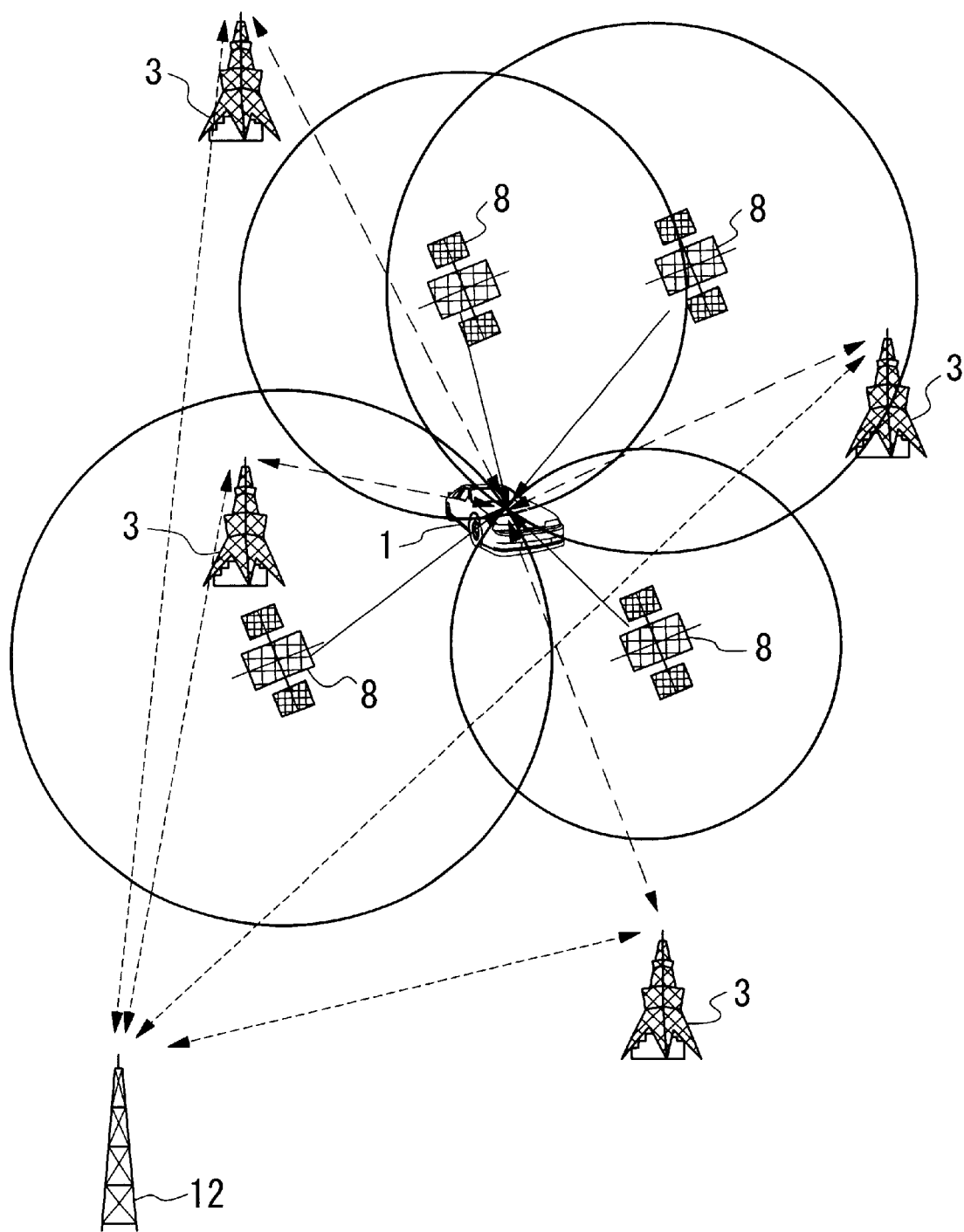
FIG. 2 is an overall structural view showing the relationships between the radio base station, the GPS satellites, and the moving body in the embodiment of the present invention.

FIG. 1 is a view of the structure of a system for deciding a position that uses radio and GPS. FIG. 2 is an overall structural view showing the relationships between the radio base station, the GPS satellites, and a vehicle.

In FIG. 2, the symbol 1 shows a vehicle serving as a mobile station or a moving body. The vehicle 1 is able to pick up GPS satellites 8 using a GPS antenna described below. The vehicle 1 is able to find the current position of the vehicle 1 by picking up four or more GPS satellites 8.

The symbol 3 shows a radio base station. Each radio base station 3 receives reference clock signals transmitted from a radio wave clock base station 12. Each radio base station 3 stores in advance precise positions for itself and for the radio wave clock base station 12. Based on the data for these positions, each radio base station 3 precisely calculates the distance between itself and the radio wave clock base station 12 and, by dividing this distance by the velocity of light, is able to calculate the radio wave propagation time until the reference clock signals transmitted from the radio wave clock base station 12 are received by each radio base station 3. Therefore, by subtracting this calculated time from the time information of the received reference clock signals in each radio base station 3, each radio base station's own reference clock signal is synchronized with the clock of the radio wave clock base station 12. Moreover, each radio base station 3 sends out radio waves containing identification signals (identification numbers) indicating each radio base station 3 as well as the reference clock signals that have been synchronized with the clock of the radio wave clock base station 12. The vehicle 1 receives these radio waves.

More specifically, the vehicle 1 receives the radio waves transmitted by each of the radio base stations 3 in three locations, determines the difference between the clock 15 provided in the vehicle 1 and the time information indicated by the reference clock signals transmitted from each radio base station 3, and calculates the distance between the vehicle 1 and the radio base stations 3. The vehicle 1 stores in advance the precise positions of each radio base station 3 and, based on the identification numbers transmitted from each radio base station 3, identifies the positions of the radio base stations 3 that transmitted the radio waves that include these identification numbers. The position of the vehicle 1 is then found based on the position of the radio base station 3 and the distances between the radio base station 3 and the vehicle 1 which are calculated for each of the radio base stations 3 in the three locations.

More specifically, as is shown in FIG. 1, a moving body radio set 2 is mounted in the vehicle 1. This moving body radio set 2 transmits radio waves using a spread spectrum method, which is the same as the method used in GPS. For example, the moving body radio set 2 may use the CDMA (Code Division Multiple Access) method. This moving body radio set 2 performs two-way communication using the spread spectrum method with a fixed radio set 4 installed in each wireless base station 3. Here, by the term spread spectrum method is meant a method which, for example, multiplexes the sound signal of each user to a wider frequency bandwidth than the bandwidth of the user signal.

The vehicle 1 is also provided with a GPS antenna 5, a correction information receiving device 6 for receiving signals used for correcting signals transmitted from the GPS satellites 8, and a GPS signal processing section 7 for receiving signals from the GPS antenna 5 and the correction information receiving device 6. As described above, the GPS antenna 5 receives radio waves from four GPS satellites 8 and the vehicle 1 finds its own position based on the received radio waves. The transmission method used in this case is the spread spectrum method.

A communication control section 9 that controls communication between the moving body and the radio base station is connected to the moving body radio set 2 and this moving body—radio base station communication control section 9 performs signal processing on reference clock signals transmitted from the radio base stations 3. A moving body position calculation section 11 is connected to the GPS signal processing section 7 and to the moving body—radio base station communication control section 9. This moving body position calculation section 11 calculates the position of the vehicle 1 from the three signals from radio base stations 3 in three locations, or from a combination of three signals from the radio base stations 3 and the GPS satellites 8, or from the four signals from four GPS satellites 8. In other words, the position of the vehicle 1 is found by obtaining at least three signals from the radio base stations 3 and the GPS, which use a common transmission method. Namely, as described above, by the vehicle 1 receiving radio waves and the difference between the time indicated by the clock 15 mounted in the vehicle 1 and the time obtained from the transmitted radio waves being determined, the distance between the vehicle 1 and the radio base stations 3 or the distance between the vehicle 1 and the GPS satellites 8 can be calculated. The position of the vehicle 1 is then found, based on the calculated distance between the vehicle 1 and the radio base stations 3 or the calculated distance between the vehicle 1 and the GPS satellites 8.

As is shown in FIG. 2, each radio base station 3 receives ground based reference clock signals from the radio wave clock base station 12 and sets these in the radio wave clock 10 shown in FIG. 1. Moreover, the radio base stations 3 are provided with a GPS antenna 5, a correction information receiving device 6, and a GPS calculation section 13 for obtaining clock signals from the signals obtained by the GPS antenna 5 and the correction information receiving device 6. Note that, because the GPS satellites 8 are time controlled by an atomic (cesium) clock, the radio base stations 3 receive ground based reference clock signals from the radio wave clock (atomic clock) provided in the radio wave clock base station 12 in order that signals that have identical properties to the clock signals obtained from the GPS satellites 8 can be obtained.

Each radio wave base station 3 is provided with a reference clock generating device 14 for obtaining reference clock signals based on ground based reference clock signals from the radio wave clock base station 12 or on clock signals obtained by the GPS calculation section 13. Because it is possible, in this way, for reference clock signals to be obtained from either the GPS satellites 8 or the radio wave clock provided in the radio wave clock base station 12, even if one of these becomes unusable, the radio wave base station 3 is still able to send reference clock signals to the vehicle 1. The fixed radio set 4 that is able to perform two-way communication with the moving body radio set 2 is connected to the reference clock generating device 14.

Figure 3:
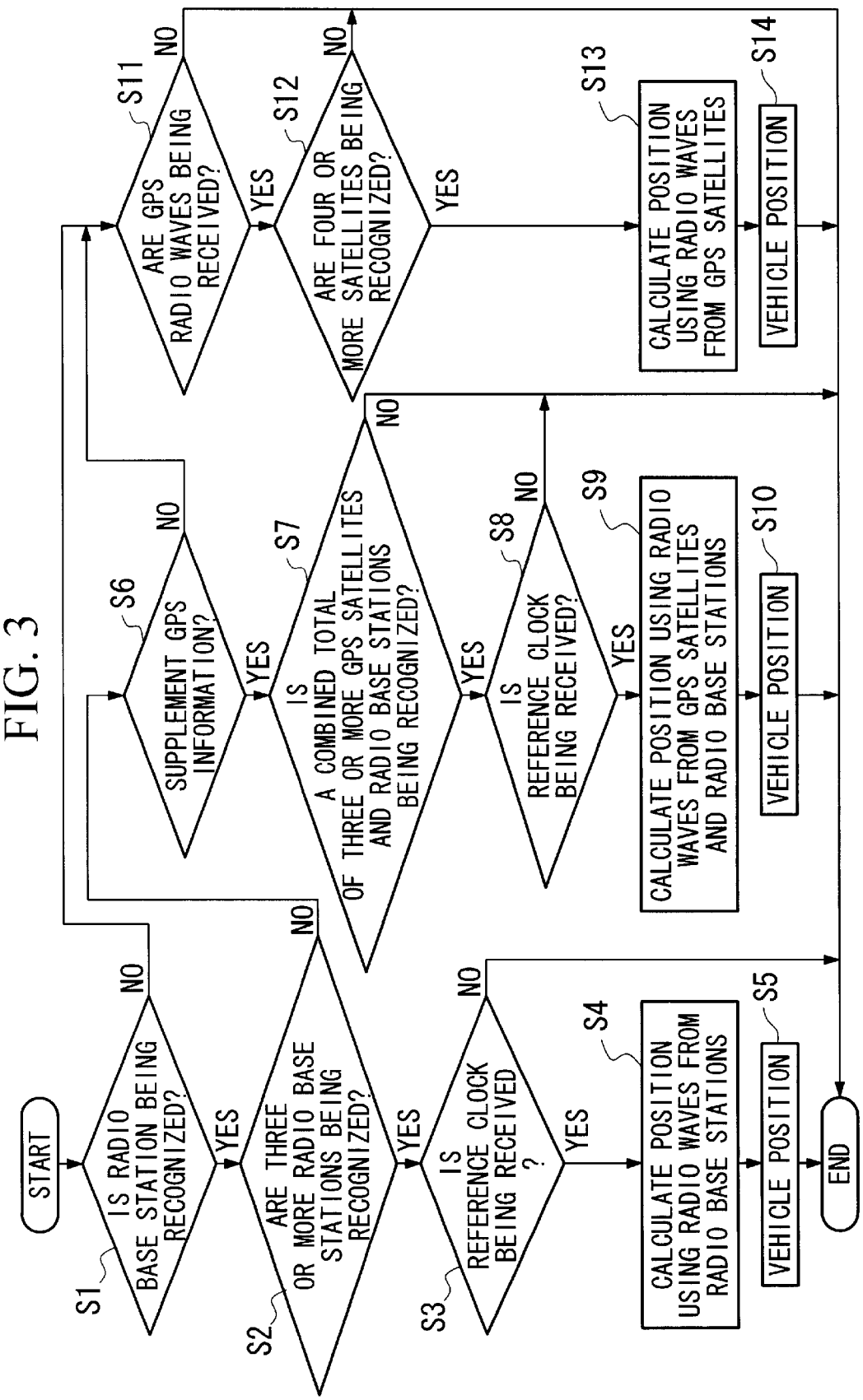
FIG. 3 is a flow chart showing the flow of the calculation by the moving body position calculation section of the embodiment of the present invention.

Next, the calculation processing performed by the moving body position calculation section 11 will be described based on the flow chart shown in FIG. 3.

In step S1, it is determined whether the moving body position calculation section 11 recognizes a radio base station. If the result of this determination is YES and a radio base station is being recognized, the moving body position calculation section 11 proceeds to the processing of step S2. If, however, the result of the determination is NO and no radio station is being recognized, then the position finding is performed using only GPS, therefore, the moving body position calculation section 11 proceeds to the processing of step S11. In step S2, it is determined whether the moving body position calculation section 11 is recognizing three or more radio base stations. If the result of this determination is YES and three or more radio base stations are being recognized, the moving body position calculation section 11 proceeds to the processing of step S3. If, however, the result of the determination in step S2 is NO and three or more radio base stations are not being recognized, the moving body position calculation section 11 moves to the processing of step S6.

In step S3, it is determined whether the moving body position calculation section 11 is receiving reference clock signals from the radio wave base stations 3. If it is not receiving reference clock signals, this is because the distance calculation in the processing described below is not possible. If the result of the determination in step S3 is YES and reference clock signals are being received, the moving body position calculation section 11 proceeds to the processing of step S4 and calculates the positions of the radio wave base stations 3 using the radio waves sent from the radio wave base stations 3. In the next step S5, the position of the vehicle 1 is determined and the control is ended. If, however, the result of the determination in step S3 is NO and reference clock signals are not being received, the moving body position calculation section 11 ends the control. In this way, when at least three radio base stations are recognized, it is possible to find the position of the vehicle 1 based on the radio waves sent from these radio base stations.

In step S6, the moving body position calculation section 11 determines whether to substitute GPS information for the information that should be acquired from the radio waves transmitted from the radio base stations. This is because, when three or more radio base stations are not being recognized, the position of the vehicle cannot be found if the GPS information is not used. If the result of the determination in step S6 is YES and GPS information will be substituted for the information, the moving body position calculation section 11 moves to the processing of step S7. If, however, the result of the determination in step S6 is NO and GPS information is not to be substituted for the information, the moving body position calculation section 11 moves to the processing of step S11.

In step S7, the moving body position calculation section 11 determines whether a combined total of three or more GPS satellites and radio base stations are being recognized. If the result of the determination is YES and a combined total of three or more GPS satellites and radio base stations are being recognized, the moving body position calculation section 11 moves to the processing in step S8. This is because position finding is not possible if three or more signals are not being received. If the result of the determination in step S7 is NO and a combined total of three or more GPS satellites and radio base stations are not being recognized, the moving body position calculation section 11 ends the control.

In step S8, the moving body position calculation section 11 determines whether reference clock signals from the recognized radio base stations 3 or clock signals from the recognized GPS satellites 8 are being received. If the result of this determination is YES and either of these signals is being received, the moving body position calculation section 11 moves to the processing of step S9 where the position is calculated using the radio waves from the GPS satellites 8 and the radio base stations 3. In the next step S10, the position of the vehicle 1 is determined and the control is ended. If the result of the determination in step S8 is NO and neither of these signals is being received, then the moving body position calculation section 11 also ends the control. In this way, when three or more radio base stations are not recognized and GPS information is substituted for the information, then if it is possible to receive three radio waves from a combination of GPS satellites 8 and radio base stations 3, it is possible to find the position of the vehicle 1.

In step S11, the moving body position calculation section 11 determines whether radio waves from the GPS satellites 8 are being received. If the result of the determination is YES and radio waves are being received from the GPS satellites 8, the moving body position calculation section 11 move to the processing of step S12. If, however, the result of the determination in step S11 is NO and GPS radio waves are not being received, the moving body position calculation section 11 ends the control. In this way, if the radio base stations cannot be recognized and the GPS satellites cannot be picked up either, then the position of the vehicle cannot be found.

In step S12, the moving body position calculation section 11 determines whether four or more GPS satellites are recognized. If the result of this determination is YES and four or more GPS satellites are recognized, the moving body position calculation section 11 moves to the processing of step S13 where the position is calculated using radio waves from the GPS satellites. In the next step S14, the position of the vehicle 1 is determined and the control is ended. If the result of the determination in step S12 is NO and four or more GPS satellites are not recognized, the moving body position calculation section 11 also ends the control. In this way, when the radio base stations are not being recognized, the position of the vehicle 1 can be found in the conventional way using radio waves from four GPS satellites.

Consequently, according to this embodiment, if the vehicle 1 is able to recognize three or more radio base stations 3, the position of the vehicle 1 can be accurately found. Namely, in the same way as in the case of determining the distance between the vehicle 1 and the GPS satellites 8, the distance between the vehicle 1 and the radio base stations 3 is obtained by determining the propagation time between two points of a radio signal and multiplying this by the velocity of light. If three or more distances between the vehicle 1 and radio base stations 3, namely, the distances between the vehicle 1 and at least three separate radio base stations 3 that have been determined in this way are calculated, the intersect point of spheres that have the respective radio base stations 3 at their center and the distances between the respective base stations 3 and the vehicle 1 as their radius is determined as the position of the vehicle 1. In particular, unlike the GPS satellites 8, because there is no intentional error contained in the radio waves from the radio base stations 3, it is possible to determine the position of the vehicle 1 with a greater degree of accuracy.

Moreover, if the number of communications that are established between the vehicle 1 and the radio base stations 3 does not reach three, or if it is not possible for the vehicle 1 to pick up four or more GPS satellites 8 because of buildings or the like obstructing the radio waves, then by using a combination of distances between the vehicle 1 and the radio base stations 3 and from the GPS satellites 8 to the vehicle 1, the three or more distances that are necessary for calculating the position of the vehicle are acquired. Using such a combination of distances, the intersect point of the spheres that have the three distances as their radius is obtained as the position of the vehicle 1. Accordingly, even when the GPS satellites 8 cannot be picked up because of obstructing buildings or the like, and even when the number of radio base stations 3 that can be recognized is insufficient, it is still possible to precisely determine the position of the vehicle 1.

Of course, the fact that the position of the vehicle 1 can be found when four or more GPS satellites 8 can be picked up is the same as in the conventional method.

It should be noted that the present invention is not limited to the above embodiment. For example, in the flow chart shown in FIG. 3, it is determined at the start whether radio base stations 3 are being recognized, however, it is also possible to determine whether the radio base stations 3 are being recognized after it has been determined whether radio waves from the GPS satellites 8 are being received. In other words, when it is not possible to accurately determine a position using just one of the GPS satellites 8 and the radio base stations 3, then the position may be found by supplementing the information from one of either the GPS satellites 8 and the radio base stations 3 with the information from the other of the GPS satellites 8 and the radio base stations 3.

Furthermore, the moving body radio set 2 in the above described embodiment may be a radio set that is mounted in the vehicle 1 or may be a portable telephone carried by the crew of the vehicle. In addition, the mobile station is not limited to a vehicle.

It is necessary to synchronize the clock 15 mounted in the vehicle 1 with the reference clock signals transmitted from the radio wave clock base station 12 or with the clock signals obtained from the GPS satellites 8. This synchronization can be achieved by correcting the clock 15, using the result obtained from the comparison of the clock signals transmitted from the four GPS satellites 8.

What is claimed is:

1. A moving body position detection method for detecting a current position of a mobile station capable of movement and also capable of data communication between itself and at least fixed stations using radio waves, comprising the steps of:
   storing precise positions of the fixed stations in advance in the mobile station;
   storing precise positions of one of the fixed stations and a radio wave clock base station in advance in the one of the fixed stations;
   synchronizing a clock of each fixed station with clocks of GPS satellites based on time information contained in radio waves sent by the GPS satellites, for keeping a common time respectively in the fixed stations, or alternatively,
   synchronizing the clock of each fixed station with a clock of the radio wave clock base station by:
   calculating the radio wave propagation time between each fixed station and the radio wave clock base station based on the positions of each fixed station and the radio wave clock base station and the speed of light,
   receiving the radio waves containing the time information sent by the radio wave clock base station,
   subtracting the radio wave propagation time from the time information of the radio wave clock base station, and
   setting the subtraction result in the clock of each fixed station;
   wherein
   the fixed stations send radio waves containing time information of the clocks therein,
   the mobile station receives the radio waves sent by the fixed stations and calculates distances between the mobile station and the fixed stations by determining differences between a clock provided in the mobile station and the time information contained in the radio waves sent by the fixed stations; and
   the mobile station calculates the position of the mobile station from the calculated distances and from the precise positions of the fixed stations that were stored in advance.

2. The moving body position detection method according to claim 1, wherein the position of the mobile station is calculated using a combination of information from the fixed station and information from the GPS satellites.

3. The moving body position detection method according to claim 2, wherein, when information cannot be obtained from a predetermined number of fixed stations, the mobile station calculates the position of the mobile station by substituting information from the GPS satellites for the information that should have been obtained from the fixed stations.

4. The moving body position detection method according to claim 2, wherein the moblie station performs communication with the fixed stations using the same transmission method as is used in the GPS satellites.

* * * * *